Jan. 12, 1960 R. M. JONES 2,921,130

AUTOMATIC GAIN CONTROL CIRCUIT FOR TELEVISION APPARATUS

Filed Oct. 4, 1955

INVENTOR.
Robert M. Jones
BY Lippincott & Smith,
Attorneys

United States Patent Office 2,921,130

Patented Jan. 12, 1960

2,921,130

AUTOMATIC GAIN CONTROL CIRCUIT FOR TELEVISION APPARATUS

Robert M. Jones, Atherton, Calif., assignor to Admiral Corporation, Chicago, Ill., a corporation of Delaware Application October 4, 1955, Serial No. 538,422

4 Claims. (Cl. 178—7.3)

Figure 1:
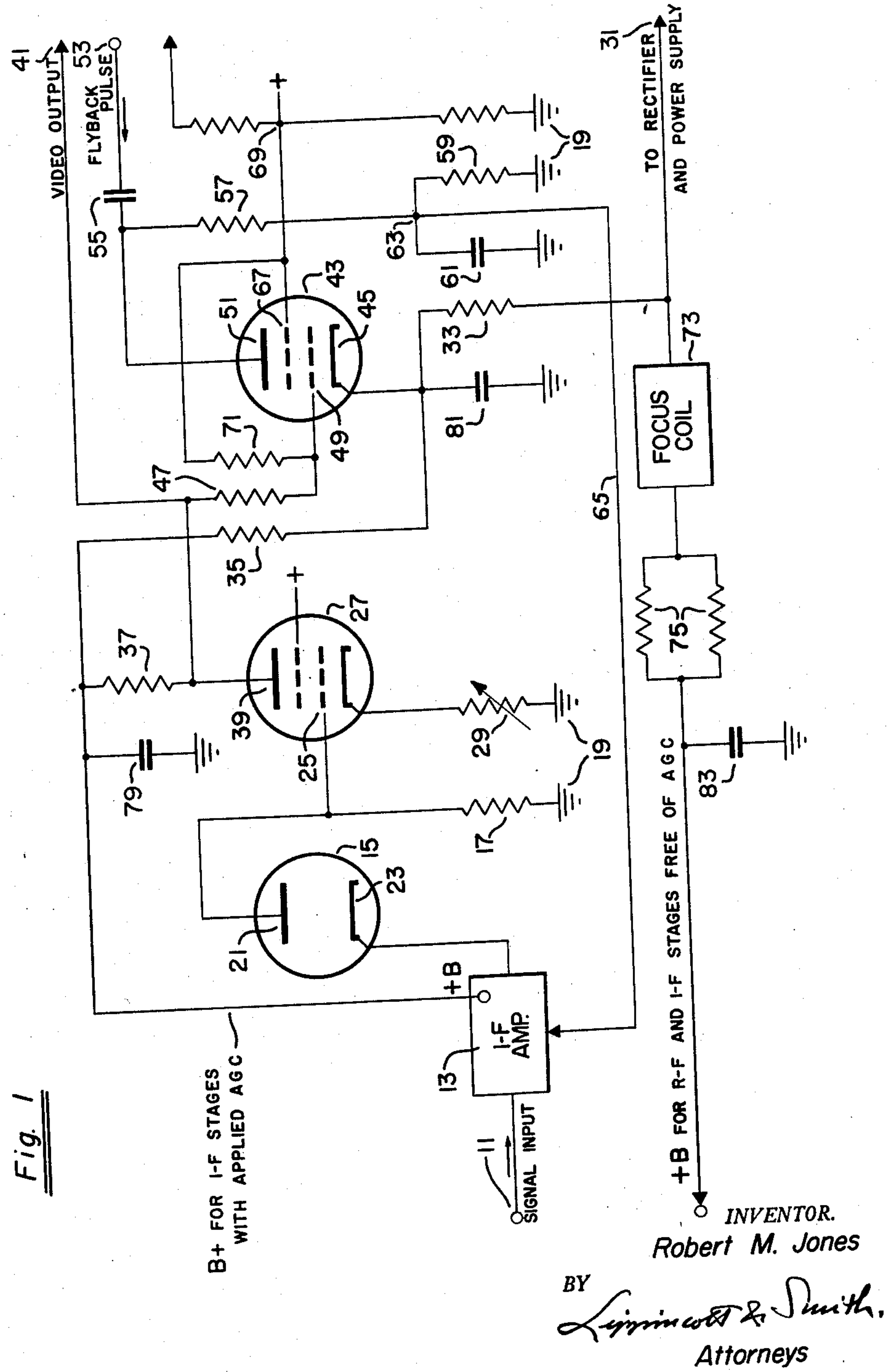

This invention relates to automatic gain control circuitry for television receivers.

The apparatus and circuitry of this invention will be set forth as a keyed automatic gain control (commonly known as "AGC") system which is to be relatively immune to impulse noise and which will improve the operation of the automatic gain control for weak signals.

A preferred form of automatic gain control system for use in television receivers operates in the so-called "keyed" fashion. This, broadly speaking, means that the automatic gain control circuitry shall function only for approximately the time period during which synchronizing signal information is received (a non-signal period with respect to video information), leaving the AGC circuitry inoperative for approximately 85% of the time during receipt of video signal transmissions. Achievement of the results and fidelity of the improved AGC operation herein to be described is provided by passing the combined video and synchronizing signal information, subsequent to suitable R.-F. amplification (if any) and conversion to an intermediate frequency, through a so-called I.-F. amplifier, the gain of which in one or more stages is controlled by the developed AGC signals. Output signals from the I.-F. amplifier are supplied to an appropriate detecting or demodulating device.

The detected output signals are then supplied to the control electrode of a suitable amplifying or translating device, commonly termed the video amplifier, with a direct connection established between this control electrode and the detector output. The collector or anode electrode of the video amplifier is supplied with operating voltage from a suitable source to which the emitter or cathode electrode of a second translating or variable-conductance device, constituting an automatic gain control stage is likewise connected. The output of the video stage is directly coupled to the control element of the automatic gain control device. Operating voltage for the collector or anode electrode of the automatic gain control device is supplied from an appropriate pulse source which is effective only during the period of receipt of horizontal or line sync information. The absence of the pulse renders the automatic gain control device inoperative during periods of video signal reception (non-sync periods) which occur during the time interval between the receipt of successive horizontal or line sync pulses.

The circuitry of the foregoing sort is so set up that the video stage is adapted to draw a relatively heavy current during periods when there is no signal input to the system, which, due to the voltage drop through the load resistance, consequently places the collector or anode element of this video amplifier at a potential generally less than that of the emitter or cathode of the automatic gain control device. The direct connection established between the video stage and the control element of the AGC device tends to bias the automatic gain control device to cut-off, so that the automatic gain control device will draw no current or, in any case, a minimum for the system. It is preferable in the operation of the circuit of this invention to provide a signal polarity such that the video amplifier tends to have its output signal reduced during periods of increased video signal level, which, because of transmission standards, will still further reduce the input during the periods of receipt of sync signals. Accordingly, during periods of receipt of sync signals there is a tendency to carry the collector or anode of the video stage to a potential such that the peaks of sync signal information drive the automatic gain control device into its conducting region, since the resultant potential at the collector or anode of the video amplifier is that which is effective at the direct-connected AGC control element. Then, when the automatic gain control device is keyed to an operative state during the receipt of a sync signal, the current flow in this device will be a measure of the signal strength received.

An appropriate storage circuit, i.e., a capacitor is connected in series with the automatic gain control device so that current flow through the automatic gain control device will charge the storage circuit negatively to a point whereat a resulting negative voltage can be fed back to the intermediate frequency (I.-F.) amplifier appropriately to control the signal amplification or gain thereof.

The present invention provides for automatic gain control current to flow only during the presence of sync signal information. At the stronger levels of received signals, the sync signal portion tends to drive the video stage to a state where it is completely cut off. When this signal level is reached, the automatic gain control voltage can no longer increase, with the result that overloading occurs. Also, since the video stage is usually non-linear in its region approaching a cut-off state, there tends to be present an effect which is known as "sync crushing" during the period of receipt of very strong signals. It will be apparent, accordingly, that too much crushing makes the subsequent obtainment of the sync signal information from the composite signal difficult, and also results in a high level of the I.-F. drive required, which can still further result in distortion, even in the I.-F. stages. A condition of this sort is particularly objectionable in color television receivers, since non-linearity in the operation results in a detected component of the color signal passing through the brightness channel.

This invention, as constituted, tends to make provision for controlling the point at which the automatic gain control device operates with respect to cut-off of the video stage, and shifts this point to some extent by the application of a positive bias of small value upon the control electrode of the automatic gain control device. Such control prevents the video stage from approaching quite as close to cut-off as would be the case in the absence of the positive bias on the automatic gain control device, but the potential effective upon the control electrode of the automatic gain control device is the same. It should be noted, however, that the applied positive bias is only of a value sufficient to prevent excessive sync signal crushing, since the noise immunity of the sync circuits is impaired otherwise.

Further, in accordance with the present invention, provisions are made for providing greater immunity of the circuitry to the effects of noise, bearing in mind that the presence of noise in the signal can affect the operation of the sync operating circuits which will result in poor synchronization. Also, noise tends to increase the AGC level of the voltage above that required to provide proper control of the I.-F. output level, thereby tends to reduce the signal and also tends to increase the possibility of failure of the sync circuits.

It is, of course, evident that the presence of noise pulses tends to develop AGC voltage only as they occur during the keying interval, but because of the formation of noise it generally happens that, particularly with the video stage cut-off and clipping these pulses generally near their base, the video stage is cut off for a relatively long time, and an excessive automatic gain control signal is developed. Considering an extreme case where the signal itself is too weak to develop AGC voltage, the voltage developed by noise tends further to weaken the signal at the detector output, so that the signal-to-noise ratio becomes even less.

The positive bias which has herein been mentioned during wide noise pulses tends to result in a still greater automatic gain control signal. To reduce the effect of a situation of this sort there is included in the circuitry from the connection to supply the operating voltage for the video amplifier a connection also to supply operating voltage to the intermediate frequency amplifier. In this circuit there is included an appropriate biasing element through which the current for the intermediate frequency amplifier, as well as the video amplifier, is drawn. Accordingly, since it has been above stated that the emitter or cathode of the automatic gain control device is connected to the source of operating voltage for the video amplifier, it will be seen that more current flow through the intermediate frequency amplifier, and the video amplifier, tends to provide a bias effective at the collector or anode of the video amplifier which is of negative polarity relative to the emitter or cathode of the AGC device. This will apply a similar negative bias upon the control element of the automatic gain control device, which will be effective in a way such as to reduce the curent flow therethrough and thus the charge stored in the storage circuit due to the automatic gain control device.

Provision is made by this invention for applying to an automatic gain control circuit a further control for automatically determining the output current flow in accordance with the signal strength in such a way that for strong signals the output is further augmented and for weak signals there is a further materially reduced output over and above that otherwise obtainable.

It accordingly becomes an object of the present invention to provide an automatic gain control which will more closely follow the strength of the incoming signals in a way which will avoid detrimental effects of overloading and yet will respond quickly as well as be effective as a keyed system, requiring a minimum number of parts and components, and which will be usable without revision of the broad forms of circuitry already in existence.

Other objects and advantages, of course, are those of providing a circuit the operation of which is of extreme stability, and which improves the efficiency over and above that of circuits heretofore developed and used.

Further objects will naturally follow when the following description and claims are read in connection with the accompanying drawing, in which the single figure illustrates the invention in one of its preferred forms.

Referring now to the single figure of the drawing, for a further understanding of the invention, input signals comprising composite television signals, including video and sync information, with or without color information as carried upon a separate sub-carrier, are supplied at the input signal terminal 11 after having been appropriately passed through suitable R-F (radio frequency) and converter stages, into the I.-F. (intermediate frequency) amplifier conventionally represented in block form at 13. The I.-F. amplifier 13 is of a conventional and well known sort, and need not herein be explained in further detail. It may comprise any desired number of stages. Signal output from the last stage of I.-F. amplifier 13 is applied to a detector or demodulator 15, from which the detected signal output is available as a negative voltage across the output resistor 17. In the connection shown, the resistor 17 has one terminal grounded at 19. The other terminal is connected to receive signals from the collector or anode 21 of the detector 15, signal input having been applied upon the cathode or emitter element 23 thereof.

The output detected signals from the detector 15 are direct-connected to be impressed upon the control electrode 25 of a video amplifier, herein conventionally represented as the electron tube 27. Contrast in the produced picture is controlled by the variable resistor 29 connected between the cathode or emitter and ground. Operating potential for the collector or anode of the video amplifier is applied from a source (not shown) connected at the terminal point 31 and connected thereto through the dropping resistors 33 and 35, and thence through the load resistor 37, which is connected to a collector electrode or anode 39 of the video amplifier.

Video signal output from the amplifier 27 becomes available at the output terminal 41 from which the signals are fed either to the image-producing cathode-ray tube to modulate it or may be fed through additional video and brightness stages if desired and thence used to modulate the cathode-ray tube.

A second translating or variable conductance device, constituting an automatic grain control stage is shown, illustratively as the electron tube 43, of which the emitter or cathode element 45 is connected to the positive voltage terminal used to supply the operating voltage for the first signal translating element or video amplifier 27. The potential available at the collector or anode 39 of the video amplifier 27 is also applied through the resistor 47 to a control element 49 of the AGC device 43. For these conditions, and neglecting for the moment the resistors 35 and 71, it may be noted that at times when the video amplifier 27 is cut off the potential available at the control element 49 of the AGC device 43 will be that avaliable at the collector or anode element 39 of the video amplifier and corresponds to that potential at which the emitter or cathode 45 is held. Operating plate voltage for the AGC translating device 43 is supplied at the collector or anode 51 in the usual form of conventional fly-back pulses which may be connected from any desired source (not shown) in the TV receiver at the terminal point 53 and supplied by way of capacitor 55. The fly-back pulse may be developed in any well known manner, such as that customarily used in television receivers. Since this pulse is present only at the time synchronizing signals are received (the pulse here used not having been smoothed in integrating circuits) it will be apparent that the only time that the AGC device 43 can be keyed to an operating state is during the time operating voltage becomes available at the terminal point 53.

The general statement of invention mentioned that the signal output from the video amplifier 27 tends, barring other conditions, to provide an operating state where the voltage available at the collector or anode 39 and effective at the control element 49 of the AGC translating device is sufficient to drive the device into the conducting region with a result that AGC current is developed in accordance with the current flow through the device. Such current flows through the resistors 59 and 57, and serves to charge the capacity 61. The result is that the negative voltage developed at the point 63 may be fed back by way of the conductor 65 to provide a negative bias or voltage which is effective in well known fashion upon one or more of the stages of the I.-F. amplifier 13. Usually, the AGC voltage is applied at one or more stages of the I.-F. amplifier which precede the last stage and is not applied to the output stage. This is usual practice although the control can, where desired, be applied to any one or all stages of the unit.

It was also explained that the video stage such as that shown at 27 is normally quite non-linear in the region approaching its cutoff region, with a result that "crushing" of the sync signal components at such signal level cannot readily be avoided. To overcome this effect, there is provided in the arrangement herein disclosed a connection from the screen electrode 67 which connects to a terminal 69, whereat positive voltage is available, so that a feedback can be provided through the resistor 71 back to the control element 49 of the AGC device 43. The voltage available at point 69 may, where desired, be that D.C. voltage available in the television receiver from the deflection circuits. This voltage is usually higher than the highest B+ value produced by the power supply and is a convenient, although not a necessary point for obtaining the screen voltage for the AGC tube 43. At this point it should be stated that the AGC tube can operate provided it is connected with a supply source of the range of as low as 100 to 150 volts higher than its cathode 45. The resistor 71 is made large compared to the resistor 47 and the small amount of current serves to provide a positive bias of just a few volts on the control element 49 which shifts the operating curve to a slight extent. The resistance 71 is made only of just such a value or size as to prevent excessive sync crushing, since otherwise the noise immunity of the sync circuits would be impaired. For convenience, resistor 71, as shown, is connected to electrode 67, but it may also be connected to any other suitable voltage source which preserves its desired functioning.

Noise effects are of a sort which tend to cut off the video amplifier 27 and are therefore clipped at the cut-off level in the output. Provided the sync separation circuits can be driven from this point the design can be considerably simplified, because the noise impulses can extend only a few volts above the sync tip level. Except where extremely weak signals are involved, they are of insufficient strength to drive the video stage near to cut-off. It is, however, apparent that noise if occurring only at times when the keying pulse available at the terminal 53 is not present, would be generally ineffective to develop AGC voltage, but at times the noise pulses are of a sort that tend to extend over a relatively long period of time. Consequently there is at times (when the video signal is very weak) a tendency for the video stage to be cut off for a relatively long time by noise pulses. If this should happen, and if the circuit does not include a resistance such as that shown at 35, it will be apparent that the voltage on the control element 49 of the AGC device 43 equals that available at the emitter or cathode 45, and AGC voltage can be developed by the noise.

For an extreme case, if the signal itself is too weak to develop AGC voltage, the voltage developed by noise further weakens the signal at the detector output 15 and signal-to-noise ratio becomes less. With a positive bias applied, as is available by the inclusion of the resistor 71, wide noise pulses tend to cause still further trouble, because the control element 49 of the AGC device 43 is then made positive during the noise pulse, which results in a still greater AGC set-up.

Since it is not desirable completely to disable the AGC device at selected times because weak signals usually change in strength over rather wide limits, and because it is desirable that the positive bias be available when a strong signal is received, this invention further makes provision for compensating for a situation of weak signals. With this invention, as it has been disclosed with, the inclusion of the resistor 35 in the path supplying operating voltage to the I.-F. amplifier 13, a voltage drop is developed across this resistor in accordance with the amount of AGC voltage applied to the I.-F. tube. During periods of weak signals the voltage drop through the resistor 35 is relatively large because the plate current in the I.-F. stages 13 is increased due to the reduction or absence of negative bias from the AGC. Likewise, a strong signal tends to develop a smaller voltage drop across resistor 35. If now, with the connection of the emitter or cathode 45 of the AGC device 43 at the high-voltage end of the resistor 35, and the positive operating voltage for the collector or anode 39 of the video amplifier being such that the available voltage on the video amplifier is obtained from the low-voltage end of resistor 35, the bias applied to the AGC translating device 43 can be made negative for weak signals. Also, the bias can be made positive for strong signals. Under these circumstances, the value chosen for the resistor 71 should be slightly lower than was first explained in the analysis made on the basis of resistor 35 being omitted, to supply more positive bias. This is because, even during strong-signal operation, the resistor 35 provides some negative bias. Also, the value of the resistor 35 should be such as to avoid the possibility of disabling the AGC device 43 completely, by supplying too much negative bias.

As the invention has been shown, purely for illustrative purposes, the positive voltage available at the terminal 31 has been indicated as also being supplied through the focusing coil, conventionally shown at 73, and a voltage-dropping network 75 to a terminal point, where the operating voltage for the suitable R-F and the last of the I.-F. stages (and any other stage not controlled by the AGC voltage) may be developed. Any other suitable voltage source may, however, be used.

The drawings show what may appear as two separate B+ supplies for the intermediate frequency (I.-F.) stages. This is purely illustrative and for convenience and thus provides one connection for those stages which are controlled by the automatic gain control (AGC) and a separate source for other stages. This form of connection offers an advantage of being able to obtain a greater differential current through resistor 35.

Various bypass condensers, such as those shown at 79, 81 and 83 may be utilized for bypassing high frequencies, as well as for hum elimination or to eliminate common coupling between stages and generally improve the circuit operation.

Having now described the invention, what is claimed is:

1. A keyed automatic gain control for television receiver apparatus comprising, in combination, an intermediate frequency amplifier for amplifying combined video and sync signals, a detecting device connected to said amplifier, a video amplifier connected directly to said detecting device to receive its output signal in a polarity to be driven toward a cut-off state by the detected sync components of the signal, a variable conductance device directly connected to the video amplifier, means whereby said variable conductance device receives as a bias potential that potential available at the output of the video amplifier, means to key said variable conductance device into an operative state only during periods of receipt of sync signal information, a capacitor connected in series with said variable conductance device, means whereby the charge on said capacitor is controlled by the current flow through said variable conductance device, means to supply to said intermediate frequency amplifier a biasing voltage determined by the charge on said capacitor, means to supply a positive bias to said variable conductance device in addition to the bias derived from its connection to the video amplifier, and means for reducing the positive bias under the control of the current flow through said intermediate frequency amplifier as varied by the charge stored on said capacitor.

2. A keyed automatic gain control for television receiver comprising, in combination, an intermediate frequency amplifier for amplifying combined video and sync signals, a detecting device connected to said intermediate frequency amplifier, a first signal translator having emitter, control and collector elements, means to supply operating voltage to said first translator, means including a direct connection from said detecting device to said first translator to drive the translator toward a cut-off state by the detected sync components of the signal, a second signal translator also having emitter, control and collector elements and having its emitter connected to receive a bias potential from the means to supply operating voltage to the first signal translator, means including a direct connection to supply signals from a collecting element of the first signal translator to the control element of the second signal translator, means to key operating voltage to said second signal translator during periods of receipt of sync signal information, a capacitor, having a means to charge the said capacitor by the current flow through the second signal translator, means to supply a biasing voltage to the intermediate frequency amplifier from said capacitor to control the output therefrom, means to supply a positive bias to the control element of said second signal translator, and means for reducing said positive bias under the control of the current flow through said intermediate frequency amplifier.

3. A keyed automatic gain control for television receivers comprising, in combination, an intermediate frequency amplifier for amplifying combined video and sync signals, a detecting device connected to receive the signal output of the intermediate-frequency amplifier, a video amplifier having an emitter, a control element and a collector element, means to supply positive voltage to said collector element of the video amplifier, means including a direct connection from said detecting device to said video amplifier to supply thereto detected signals of a polarity adapted to drive the video amplifier toward a cut-off state, a variable-conductance device also having emitter, control and collector elements, means connecting the last-mentioned emitter element to said means to supply positive voltage to the video amplifier, means including a direct connection from said collector element of the video amplifier to said control element of said variable-conductance device for causing conduction by said device during periods of receipt of sync signals, means including a capacitor connected to the collector element of said variable-conductance device so that the charge thereon is controlled by the current flow through a variable-conductance device, means to supply a biasing voltage to said intermediate-frequency amplifier from said capacitor, means to supply a positive bias to said control element of said variable-conductance device independently of said video amplifier, and means for reducing said positive bias under the control of the current flow through said intermediate-frequency amplifier as varied by the charge on said capacitor.

4. In a television receiver, a keyed automatic-gain-control system comprising a variable-gain, intermediate-frequency amplifier, anode-voltage-supply connections for said intermediate-frequency amplifier, bias-voltage-supply connections for said intermediate-frequency amplifier, said intermediate-frequency amplifier having a reduced gain and also a drawing less current through said anode-voltage-supply connections as the voltage supplied thereto through said bias-voltage-supply connections becomes more negative, a detector connected to receive output signals from said intermediate-frequency amplifier to provide a detected combined video-signal and synchronizing-signal voltage of negative polarity, a video amplifier stage comprising a first electron tube having an anode, a control electrode and a cathode, the aforesaid control electrode being directly connected to receive output signals from said detector so that said first tube is driven toward cut-off by said combined video-signal and synchronizing-signal voltage, a video-stage load resistor connected between the aforesaid anode and said anode-voltage supply connections for the intermediate-frequency amplifier, a voltage source, a first series resistor connected between said source and said anode-voltage-supply connections whereby there is provided across said first series resistor a voltage drop proportional to the sum of the currents conducted by said intermediate-frequency amplifier and said first electron tube, an automatic-gain-control stage comprising a second electron tube having an anode, a control electrode and a cathode, a direct connection between said last-mentioned cathode and said voltage source, a second series resistor directly connected between said last-mentioned control electrode and the anode of said first electron tube, whereby said second electron tube is negatively biased by the aforesaid voltage drop across said first series resistor and by the voltage drop across said video-stage load resistor, means including circuit connections for supplying an additional positive bias to said last-mentioned control electrode, means for supplying positive-going voltage pulses to said last mentioned anode during receipt of each synchronizing signal means including a capacitor connected to said last-mentioned anode so as to be negatively charged in proportion to the current conducted by said second electron tube, whereby an automatic-gain-control voltage is developed across said capacitor, and means including circuit connections between said capacitor and said bias-voltage supply connections for applying said automatic-gain-control voltage as a negative bias to said intermediate-frequency amplifier.

References Cited in the file of this patent

Rider's Television Manual, vol. 13; Admiral TV, page 13–13 (Admiral ch. 21B1), copyrighted September 27, 1954.

UNITED STATES PATENT OFFICE

CERTIFICATE OF CORRECTION

Patent No. 2,921,130 January 12, 1960

Robert M. Jones

It is hereby certified that error appears in the printed specification of the above numbered patent requiring correction and that the said Letters Patent should read as corrected below.

Column 4, line 23, for "grain" read -- gain --; line 35, for "avaliable" read -- available --; column 7, line 36, for "a", first occurrence, read -- the --; column 8, line 34, for "last mentioned" read -- last-mentioned --; line 35, after "signal" insert a comma.

Signed and sealed this 1st day of November 1960.

(SEAL)
Attest:

KARL H. AXLINE
Attesting Officer

ROBERT C. WATSON
Commissioner of Patents